July 11, 1961 P. E. AXON 2,991,921

TAPE GUIDE FOR MAGNETIC TAPE RECORDER

Filed April 3, 1959 2 Sheets-Sheet 1

INVENTOR.
PETER ERIC AXON

BY William J. Flynn
ATTORNEY

July 11, 1961 P. E. AXON 2,991,921
TAPE GUIDE FOR MAGNETIC TAPE RECORDER
Filed April 3, 1959 2 Sheets-Sheet 2
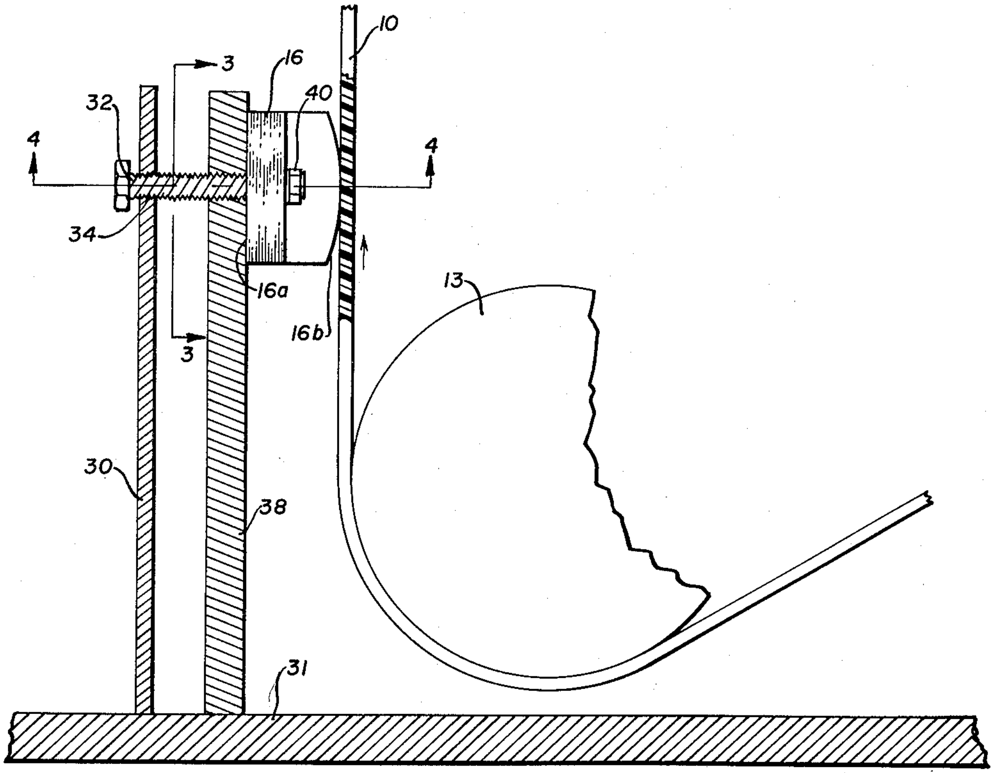
Fig. 2
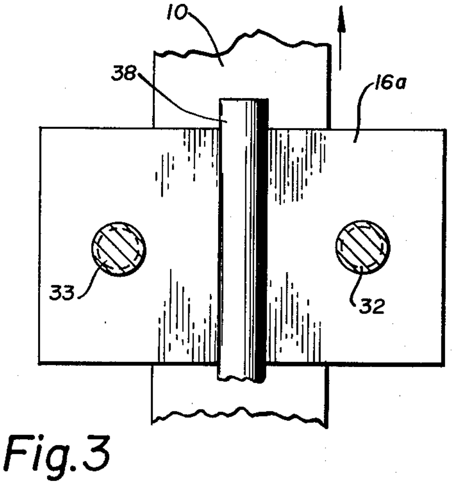
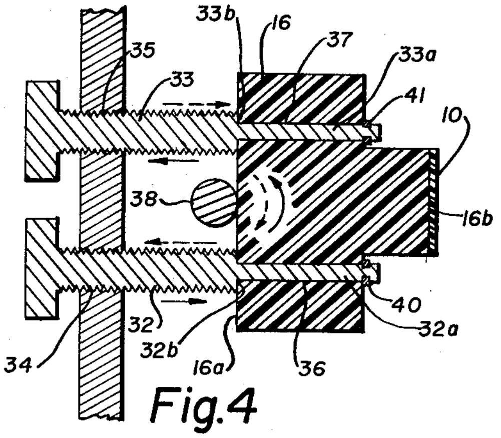
Fig. 4
Fig. 3
INVENTOR.
PETER ERIC AXON
BY
William J. Flynn
ATTORNEY 2,991,921
Patented July 11, 1961

2,991,921

TAPE GUIDE FOR MAGNETIC TAPE RECORDER

Peter Eric Axon, London, England, assignor to Clevite Corporation, Cleveland, Ohio, a corporation of Ohio Filed Apr. 3, 1959, Ser. No. 804,000
Claims priority, application Great Britain Apr. 8, 1958
5 Claims. (Cl. 226—199)

This invention relates to magnetic tape recording and reproducing apparatus in which the tape is advanced at high speed during recording or playback.

It is conventional practice in magnetic tape recording and reproducing machines to advance the magnetic tape from a supply reel to a take-up reel, the tape passing over one or more magnetic transducer heads during its travel from the supply reel to the take-up reel. The magnetic tape is maintained under tension between the two reels and is suitably guided smoothly over the transducer head or heads. With such arrangements, no particular difficulty is encountered when the tape is advanced at a relatively slow speed, as would be the case in the magnetic recording or reproduction of sound. For such applications the tape can be guided during its travel over the transducer head or heads by providing flanged rollers or trough-like guides which restrain the tape against transverse movement. While such expedients for guiding the tape are entirely practical for slow speed application, they are not suitable for situations where the tape must be advanced at a much higher speed.

For example, one practical technique for recording television signals magnetically involves the provision of a multi-channel magnetic tape which is advanced at a speed of the order of 200 inches per second past the transducer head or heads. The tape has a plurality of channels or tracks which run lengthwise of the tape and are spaced apart laterally across the surface of the tape. Each transducer head comprises a plurality of laterally spaced, individual transducers which are positioned in recording or playback relationship with respect to individual channels or tracks on the tape. For proper operation it is essential that the individual channels or tracks on the tape be accurately aligned with the respective individual transducers. Because of the relatively high speed at which the tape moves, the previously used flanged rollers or trough-like guides are not suitable for such guiding purposes because their use would involve excessive friction with the tape. Particularly is this true where the tape speed must be maintained constant with very high accuracy, as in the case of recording or playing back television programs.

Another requirement of a multi-channel magnetic tape recording and reproducing apparatus designed for recording or playing back high frequencies of the order involved in television signals is that the tape should not be twisted about its longitudinal axis as it passes over the transducers. If such twisting does take place, different points on the tape across its width will be at different distances from the transducer head. When recording or playing back high frequency signals, even a small gap between the transducer head and the magnetic tape will seriously reduce the strength of the signal being recorded or played back. Therefore, twisting of the tape must be avoided.

The present invention is directed to a novel arrangement which satisfies these stringent requirements and which, therefore, is particularly advantageous for use in magnetic recording or reproducing apparatus intended for recording or playing back television programs.

Accordingly, it is an object of this invention to provide in a magnetic recording and/or reproducing apparatus a novel and improved arrangement for guiding a magnetic tape during recording or playback.

It is also an object of this invention to provide in a magnetic recording and/or reproducing apparatus a novel arrangement for guiding a multi-channel magnetic tape past one or more transducer heads while the tape is moving at high speed, such as of the order of 200 inches per second.

Another object of this invention is to provide in a magnetic recording and/or reproducing apparatus a novel arrangement for guiding a magnetic tape during recording or playback which avoids excessive friction against the tape, thereby enabling the tape to be advanced at a uniform high speed through a predetermined path.

In accordance with the present invention, the foregoing objectives are accomplished by the provision of a guide member which presents a curved guide surface which along its length is convex toward, and extends substantially in the direction of movement of, the tape. The guide member is mounted so as to be adjustable angularly about an axis extending parallel to the length of the tape and parallel to the surface of the tape as it moves over the guide member. Such adjustment is made to insure that the line of engagement between the curved guide surface on the guide member and the tape will be precisely perpendicular to the direction of movement of the tape, transversely across the tape from one edge to the other. In one practical embodiment, this guide member may be constituted by the erase head in the magnetic recording and reproducing apparatus.

Further objects and advantages of this invention will be apparent from the following detailed description of a presently-preferred embodiment thereof, which is shown in the accompanying drawings.

In the drawings:

FIGURE 2 is an enlarged fragmentary elevational view showing the mounting of the guide member in accordance with the present invention;

FIGURE 3 is a section taken along line 3—3 in FIGURE 2; and

FIGURE 4 is a section taken along the line 4—4 in FIGURE 2.

Figure 1:
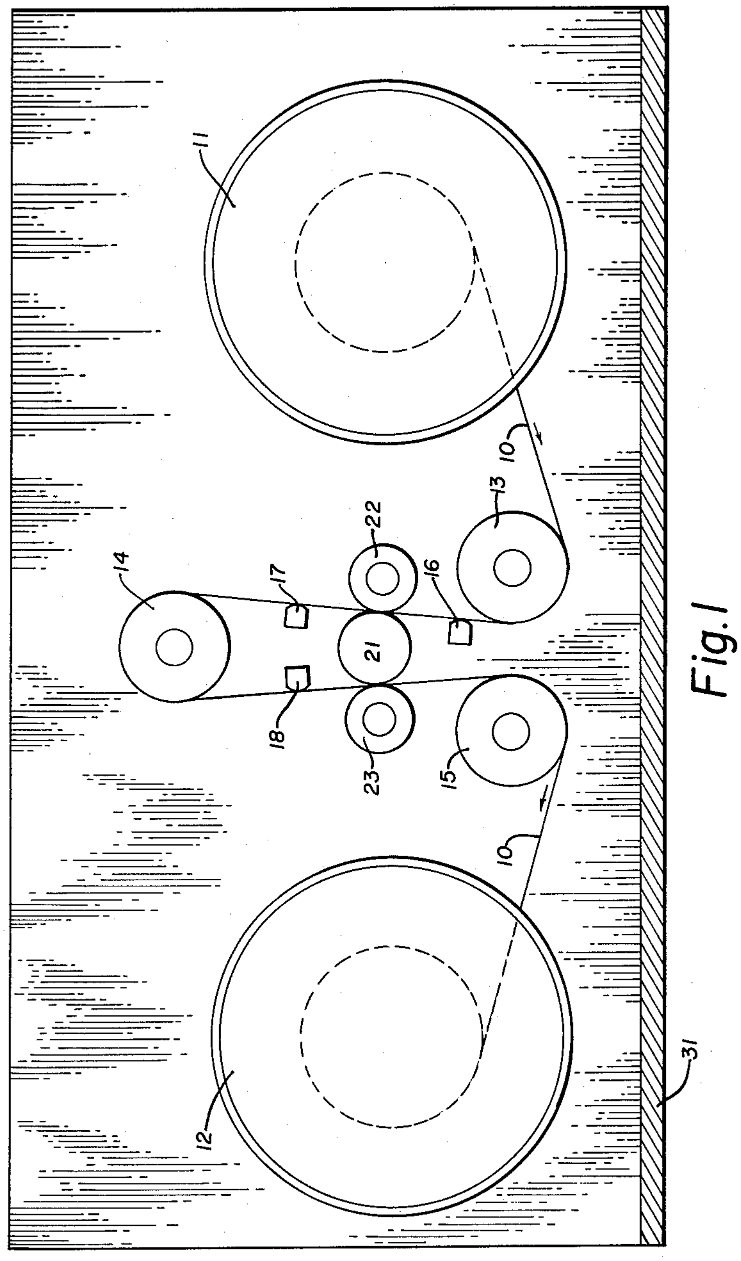
FIGURE 1 is a schematic elevational view showing a magnetic tape transport mechanism in which the present invention may be employed.

Referring first to FIGURE 1, in one practical embodiment the present invention may be incorporated in a magnetic recording and reproducing machine having a tape transport mechanism which includes a motor-driven supply reel 11 from which the magnetic tape 10 is unwound; a motor-driven take-up reel 12, pulleys 13, 14 and 15 spaced apart along the path of movement of the tape between the supply reel and the take-up reel, and a motor driven capstan 21. A pair of rubber covered pinch rollers 22 and 23 are mounted so as to be capable of pinching the tape 10 against the capstan 21 to provide a captive loop portion of the tape which is moved at uniform high speed past the transducer heads 17 and 18. The capstan 21 is driven at a speed such that the tape 10 is maintained under tension between the capstan and the pulley 13. The tape may be a multi-channel tape and the transducer heads may be multi-channel heads, each including individual transducers for the respective channels on the tape.

In accordance with the present invention there is provided a guide member 16, which is located between the capstan 21 and the pulley 13 and across which the tape 10 is advanced. In one practical embodiment this guide member 16 may also constitute the erase head of the apparatus. However, if desired, it may be simply a guide member and perform no other function.

Referring to FIGURES 2–4, the guide member 16 is supported from a wall 30 which extends up from the bottom 31 of the frame on which the tape transport mechanism is mounted. As best seen in FIGURE 4, a pair of screws 32 and 33 are threadedly mounted in screw-threaded openings 34 and 35, respectively, in the wall 30. These screws are formed with reduced diameter stems **32*a* and 33*a* which extend loosely through corresponding holes 36 and 37 formed in the guide member 16 on either side of the tape. Conventional generally C-shaped snap rings 40 and 41 are seated in grooves in these stems just beyond the holes 36 and 37. At the juncture of each stem 32*a* or 33*a* with its larger diameter screw-threaded shank there is formed a transverse shoulder 32*b* or 33*b* which engages the back 16*a* of the guide member 16. With this arrangement each screw is locked to the guide member 16. Any axial displacement of either screw will be imparted to the guide member 16** through the coupling provided by the shoulder or the snap ring on that screw. In place of this captive screw arrangement, which of itself is conventional and is shown by way of example only, any other suitable captive screw arrangement may be provided.

An upstanding post or rib 38 extends up midway between the screws 32 and 33 and is engaged by the back face **16*a* of the guide member 16**.

The front face **16*b* of the guide member 16 constitutes a segment of a cylinder which is convex toward the tape 10. The tape moves substantially vertically upward past this curved guide surface 16*b* on the guide member 16, this guide surface 16*b* extending generally in the same direction as the length of the tape during this portion of its travel. More precisely, the tape extends tangent to the curved guide surface 16*b* along a line extending transversely across the tape from one edge to the other. That is, the axis of the cylindrical curved surface 16*b* lies in a direction perpendicular to the length of the tape and parallel to the surface of the tape during the latter's travel over the guide member 16. As already mentioned, the tape is maintained under tension at this point and touches the guide surface 16*b* on the guide member 16** along a line of contact transversely across the tape which is to be maintained substantially perpendicular to the length and direction of travel of the tape at this location.

The axes of the two captive screws 32 and 33 lie in a plane which extends perpendicular to the direction of travel of the tape across the guide surface **16*b* and perpendicular to the surface of the tape at this point. The upstanding rib or post 38 extends parallel to the direction of movement of the tape 10 across the guide member 16**.

With the foregoing arrangement, alignment of the tape 10 with respect to the transducing heads 17 and 18 is achieved approximately by accurate alignment of the supply and take-up reels 11 and 12 and the pulleys 13, 14 and 15, the pulleys being accurately machined and of massive construction. The capstan 21 is mounted on an axle having a massive fly wheel thereon. The use of massive and accurately machined parts serves to minimize difficulties of tape alignment caused by wobble and uneven rotation of the moving parts.

In accordance with the present invention, final accurate alignment of the tape 10 is achieved by adjusting the position of the guide member 16 angularly about the upstanding rib or post 38 so as to position the curved guide surface **16*b* on the guide member substantially aligned with the direction of movement of the tape, with the line of contact between the tape and this guide surface extending precisely perpendicular to the length and direction of movement of the tape across the guide member. Such adjustment of the guide member 16 is performed by adjusting the screws 32 and 33. As shown by the full line arrows in FIGURE 4, if the screw 32 is turned inward toward the tape 10 and at the same time the other screw 33 is turned outward away from the tape 10, the guide member 16 will be turned counterclockwise in FIGURE 4 about the fulcrum or axis defined by the upstanding post or rib 38. Conversely, if the screw 33 is adjusted inward toward the tape and the other screw 32 is adjusted outward from the tape, the guide member 16 will be turned about the upstanding post or rib 38** clockwise in FIGURE 4, as indicated by the dashed line arrow in that figure.

It will be apparent that the above-described adjustment of the guide member 16 in either direction may be made quite readily and conveniently. It has been found that such adjustment of the guide member 16 angularly about an axis which extends parallel to the direction of movement of the tape across the guide member is all that is required to maintain precise guiding of the tape 10. The line of contact between the tape and the convex surface **16*b* on the guide member is established to be precisely perpendicular to the direction of movement of the tape and the individual channels or tracks on the tape stay precisely aligned with the respective individual transducers in the multi-channel transducer heads 17 and 18**. This completely eliminates the need for flanged rollers or trough-shaped guide members which would tend to introduce excessive friction into the tape transport operation when the tape is advanced at extremely high speeds, such as would be encountered in recording television programs magnetically on a multi-channel tape.

From the foregoing, it will be apparent that the illustrated arrangement constitutes a simplified and effective means for accomplishing the stated purposes of this invention, however, it is to be understood that, while there has been described in detail herein and illustrated in the accompanying drawing a specific presently-preferred embodiment of this invention, various modifications, omissions and refinements which depart from the disclosed embodiment may be adopted without departing from the spirit and scope of this invention.

Having thus described my invention, I claim:

1. In a magnetic recording and/or reproducing apparatus having a tape transport mechanism with means for advancing a tape at high speed along a predetermined path of movement, the improvement which comprises a rigid guide member at one side of the tape which presents at the front a rigid curved guide surface that is convex toward the tape, said curved guide surface engaging the tape and along the length of its convex curvature extending generally in the direction of the tape movement past the guide member, a fulcrum member engaging the back of said guide member and extending parallel thereto and parallel to the path of movement of the tape past the guide member, and means for adjusting said guide member angularly about said fulcrum member and for fixedly positioning said guide member so as to establish a line of contact between said curved guide surface on the guide member and the tape which extends from edge to edge across the tape perpendicular to the length of the tape.

2. In a magnetic recording and/or reproducing apparatus having a tape transport mechanism with means for advancing a magnetic tape at high speed along a predetermined path of movement during a portion of which, at least, the tape is substantially straight from edge to edge across its width, the improvement which comprises a rigid guide member at one side of the tape which presents at the front a rigid curved guide surface engaging the tape completely across the width of the tape at said portion of its path of movement, said curved guide surface along its length being convex toward the tape and across its width being straight from edge to edge across the tape, a fulcrum member engaging the back of said guide member and extending parallel thereto and parallel to the path of movement of the tape past the guide member, and means for adjusting said guide member angularly about said fulcrum member and for fixedly positioning said guide member so as to establish a straight line of contact between the tape and said guide surface which extends across the tape from edge to edge substantially perpendicular to the direction of movement of the tape past the guide member.

3. The improvement of claim 2 wherein said adjusting means comprises a pair of captive screws coupled to said guide member on opposite sides of said fulcrum member, said screws being adjustable individually toward and away from the tape for adjusting the guide member angularly about said fulcrum member.

4. The improvement of claim 3 wherein the axes of said screws lie in a plane which extends perpendicular to the direction of travel of the tape across the guide member and perpendicular to the surface of the tape thereat.

5. The improvement of claim 2 wherein there is provided means for maintaining the tape under tension as it travels across said guide member.

References Cited in the file of this patent

UNITED STATES PATENTS

| | | |
|---|---|---|
| 1,240,631 | Trier | Sept. 18, 1917 |
| 1,404,122 | Hofwing | Jan. 17, 1922 |
| 1,418,653 | Kilgore | June 6, 1922 |
| 1,638,560 | Beveridge | Aug. 9, 1927 |